United States Patent [19]
Iseli

[11] Patent Number: 5,826,465
[45] Date of Patent: Oct. 27, 1998

[54] BAND SAW BLADE MANUFACTURING METHOD

[75] Inventor: Benno Iseli, Schotz, Switzerland

[73] Assignee: Iseli & Co. AG, Switzerland

[21] Appl. No.: 722,253

[22] PCT Filed: Apr. 3, 1995

[86] PCT No.: PCT/EP95/01230

§ 371 Date: Dec. 16, 1996

§ 102(e) Date: Dec. 16, 1996

[87] PCT Pub. No.: WO95/26850

PCT Pub. Date: Oct. 12, 1995

[30] Foreign Application Priority Data

Apr. 5, 1994 [GB] United Kingdom .................... 9406628

[51] Int. Cl.[6] ................................................. B23D 63/12
[52] U.S. Cl. ...................................... 76/112; 76/27; 76/37
[58] Field of Search .................................... 76/27, 37, 41, 76/43, 112, 50, 50.2, 75

[56] References Cited

U.S. PATENT DOCUMENTS

| | | |
|---|---|---|
| 971,841 | 10/1910 | Hibbert et al. ............................... 76/27 |
| 3,315,548 | 4/1967 | Anderston et al. ........................ 76/112 |
| 3,460,407 | 8/1969 | Vollmer ....................................... 76/37 |
| 3,611,839 | 10/1971 | Idel et al. .................................. 76/112 |
| 3,919,900 | 11/1975 | Allen et al. ............................... 76/112 |
| 4,557,171 | 12/1985 | Stolzer ..................................... 76/112 |
| 4,587,869 | 5/1986 | Hamer ........................................ 76/37 |

*Primary Examiner*—Hwei-Siu Payer
*Attorney, Agent, or Firm*—Locke Reynolds

[57] ABSTRACT

A method of and apparatus for handling a band saw for the purposes of effecting manufacturing and/or repair operations upon the band saw characterized by, during such manufacturing and/or repair operations upon the band saw (5), supporting the band saw in such manner that the weight of the band saw (5) is not carried by an edge of the band saw (5). The support includes rotatable supports (24, 25) for supporting the band saw; the rotatable supports being positionally adjustable to accommodate differing band saw lengths; and in that adjustments are provided for enabling the rotatable supports to be displaced to advance the band saw to a machining station (22) for defining a working station/position at which a manufacturing and/or repair operation can be effected.

8 Claims, 3 Drawing Sheets

BAND SAW BLADE MANUFACTURING METHOD

BACKGROUND OF THE INVENTION

This invention is concerned with the manufacture of saws of the kind in which the individual teeth of the saw are provided with hard material tips.

In particular, the present invention is concerned with the manufacture of band saws, and more particular to the manufacture of wide band saws which latter can conveniently be regarded as having a body depth from, for example, 100 millimeters to depths of the order of 350 millimeters or possibly more.

In general, the hard material tips, which have been conventionally formed from a number of materials i.e., tunsten carbide, are attached to the individual teeth of the band saws and have, in practice, to be very carefully positioned and firmly secured/mounted to the teeth, and also need to be accurately machined to provide the desired angular relationships between the working edges/faces of the tips which edges/faces have been found to be essential for the required standards of operational performance from the thus tipped band saws.

Conventionally, after such attachment to the teeth and any post attachment treatments such as heat treating, swaging deemed necessary, each such tip must be machined to provide predetermined angular relationships between the front face, the top face and the two side faces of the tip. In particular, the top and front faces have to be carefully angled with respect to the cutting direction/rotation of the saw when in use so that the required so-called front face rake angle and tip height is attained, and at the same time the requisite shapes for the gullet regions between adjacent teeth of the saw are preserved. In addition, it is conventionally necessary for the two side faces to be machined i.e., ground to the form required.

It is known to carry out such machining of the tips by mounting the saw whose tips are to be machined to machine(s) so that the body of the band saw is vertical with the teeth whose tips are to be machined uppermost. Such machines are conventionally provided with means for correctly positioning a saw tooth whose tip is next to be ground with respect to a grinding wheel or grinding wheels so that the wheel or wheels can be caused to effect a required machining operation, and with means for indexing i.e., advancing, the saw so that the next tip to be ground can be moved to the position at which it can be machined as required.

In the case of the machining of band saws of large physical dimensions such as is involved when machining long wide band saws which can be of lengths measured in meters and have a saw body depths as previously mentioned i.e., for example, 200 millimeters there arises considerable difficulties and problems in relation to the physical handling of the saw.

Furthermore, it is necessary to bear in mind that with these known machines for machining band saw tooth tips it is necessary to ensure that the plane of the saw body to be machined is positioned accurately vertical during the machining operations.

With this particular alignment of the band saw body, in order to mount the band saw to the machining apparatus the saw has to be man-handled so that it straddles the grinding machine whereby the machine is effectively located within the boundary of the band saw in order that the teeth of the saw can be successively presented to the actual grinding location/station of the machine at which locations grinding wheel(s) are operationally provided.

In view of the overall length of the band saw special saw support arrangements have to be provided to ensure that the edge of the saw remote from the edge with the teeth required to be machined is maintained in the correct horizontal plane for the purposes of machining of the tipped teeth. With this arrangement the part circular lengths of the band saw at the end portions/regions of the band formation, that are located up-stream and downstream of the grinding wheels being used to machine the saw, have to be mounted upon suitable supports which not only enable correct and acceptable supporting of the saw but also enable the saw to be progressively indexed past the apparatus grinding station.

The indexing of the saw effectively stepwise moves the body of the saw through the machining station. The end regions of the band saw, the positions of which latter being effectively defined by the overall length of the saw band are likewise supported. Usually, the supports for the saw such comprise a series of rolls mounted upon suitable supports which maintain the horizontal setting for the edge of the saw remote from the teeth being machined. With this arrangement the saw usually needs to be supported at a considerable number of places.

Since, for the purposes of machining the saw teeth, the teeth project upwards to create a very hazardous environment in the vicinity of the machine.

A further problem arises when it is required to machine band saws which are double sided in that the saw includes teeth on along opposite edges of the saw body so that what ever the vertical orientation of the saw there are teeth located along the bottom edge of the saw. It follows that the tipped teeth when in the bottom position carry the total weight of the saw and as a result are prone to damage whilst the teeth along the opposite edge are being machined. This damage is highly undesirable particularly since the very purpose of machining is to produce very precisely formed cutting edges whereby any damage effectively destroys the usefulness of the band saw.

It is an object of the invention to simplify the handling of band saws for the purposes of machining the hard material tips provided on the teeth.

SUMMARY OF THE INVENTION

Broadly, according to a first aspect of the invention there is provided a method of handling a band saw for the purposes of effecting manufacturing and/or repair operations upon the band saw. The manufacturing and/or repair operations can include finishing the teeth of the band saw by applying hardened tips to teeth of the band saw, and/or by machining the surfaces or faces of said tips, metallurgically altering the band saw teeth or tips, swaging the band saw, or machining or grinding at least parts of the teeth of the band saw. During such manufacturing and/or repair operations upon the band saw the weight of the band saw is not carried by an edge of the saw. The band saw is mounted upon rotatable supports positionally adjustable relative to each other to accommodate different lengths of saw.

Broadly, according to a further aspect of the invention there is provided a method of handling a band saw in which the plane of the body of the saw is positioned non-vertically/horizontally for the purposes of effecting manufacturing and/or repair operations upon the band saw. The rotatable supports for the band saw are so positioned that the lengths of the band saw between the rotatable supports are generally horizontal.

Broadly, according to a further aspect of the invention there is provided a method of handling a band saw for the purposes of machining the surfaces/faces of tips provided upon the teeth thereof involving the step of mounting the band saw on the supports and advancing the supports and the thus mounted band saw to a work station/position at which the band saw can be subjected to at least one manufacturing and/or repair operation so that the planar surface of the body of the saw is supported.

Broadly, according to a further aspect of the invention there is provided apparatus for effecting manufacturing and/or repair operations upon the band saw in which band saw is so positioned that the plane of the body of the saw is non-vertical/horizontal for the purposes of such operations. Preferably, the method includes the step of mounting the rotatable supports also for heightwise adjustment such that the rotatable supports and a band saw carried thereby can be raised to such level with respect to the operational work station/position that a lower length of the band saw is presented to said work station/position.

Broadly, according to a still further aspect of the invention there is provided apparatus for the purposes of effecting manufacturing and/or repair operations upon the band saw in which during such manufacturing and/or repair operations upon the band saw the weight of the band saw is not carried by an edge of the saw.

In accordance with a still further aspect of the invention there is provided apparatus for the machining of a band saw, characterized in that the apparatus includes means for so supporting the saw during the machining thereof that the body of the band saw is so positioned that the planar surface of the body of the saw is supported upon support means. Broadly, according to a further aspect of the invention there is provided apparatus for handling a band saw for the purposes of effecting finishing operations upon the band saw, the apparatus including rotatable support means for mounting the band saw in a generally horizontal setting for the purposes of said operations and so that the weight of the band saw is not carried by an edge of the saw; means for enabling positional adjustment of the separation of axes of rotation of the support means to accommodate mounting and unloading differing band saw lengths; means for defining a work station/position at which said finishing operation can be effected; and means for enabling the rotatable supports to be axially displaces towards or away from the work station thereby to advance or withdraw the band saw to or from said work station for effecting manufacturing and/or repair operations upon the band saw in which the band saw is so positioned that the plane of the saw is non-vertical/horizontal for the purposes of such operations.

BRIEF DESCRIPTION OF THE DRAWINGS

For a better understanding of the invention and to show how to carry the same into effect reference will now be made to the accompanying drawings in which.

DESCRIPTION OF THE PREFERRED EMBODIMENTS

Figure 1:
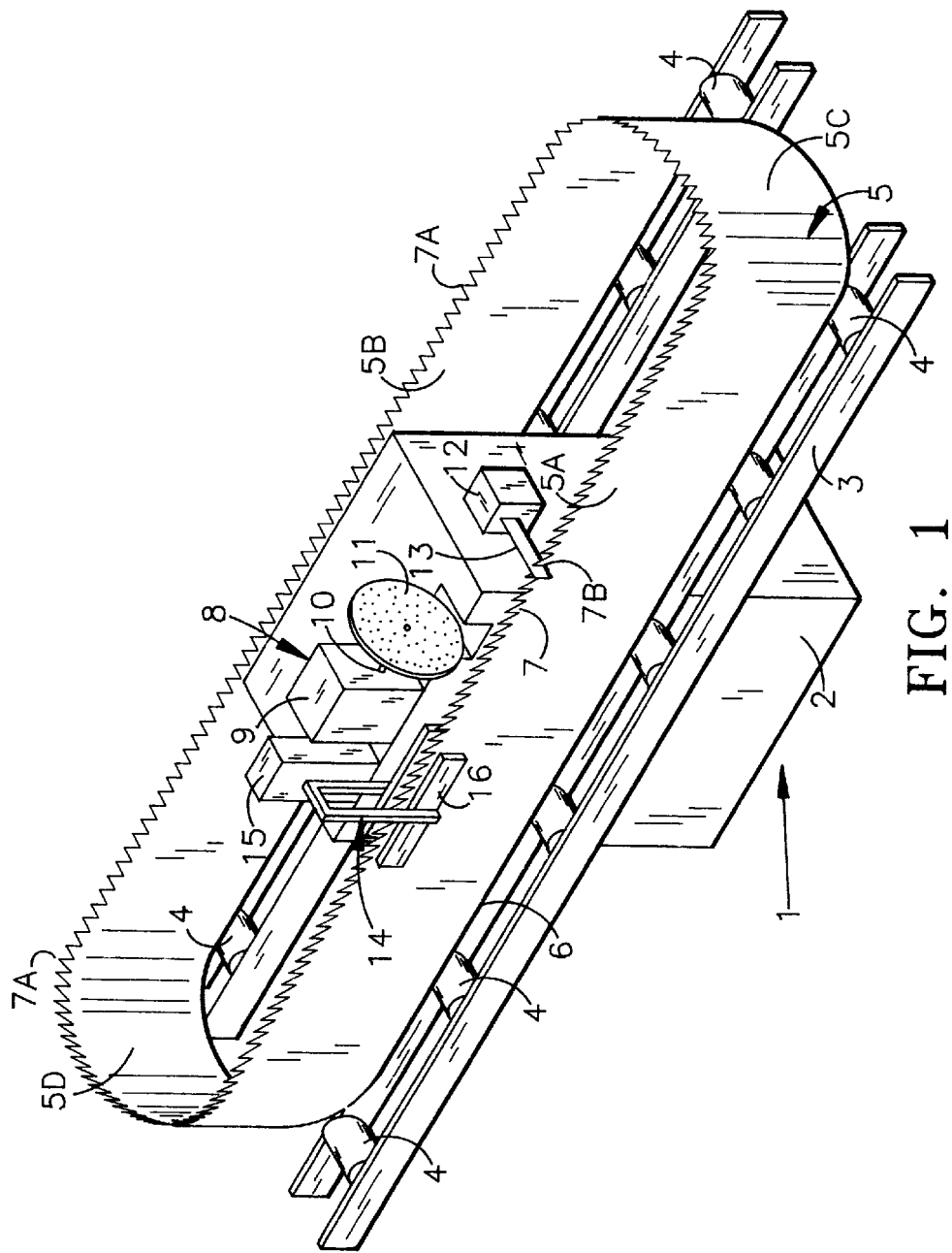
FIG. 1, very schematically illustrates the conventional orientation of a band saw with respect to a tooth tip grinding machine.
Figure 2:
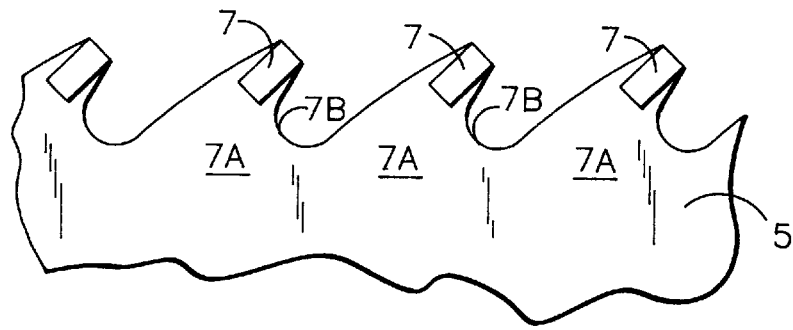
FIG. 2 shows to an enlarged scale a fragmentary length of a band saw the Figure schematically illustrating a typical tooth and tip formation.

Referring now to FIGS. 1 and 2 of the drawings, the FIG. 1 very schematically depicts a conventional operational layout for a band saw tip grinding machine 1. The machine includes a main body 2 to which is mounted a saw support frame 3 serving to carry a plurality of saw support members 4 commonly formed by rolls. Further saw guide and support members 4 are or can be mounted from the machine body where thought to be useful and/or convenient. These various guide and support members 4 are so positioned with respect to the body 2 of the machine as to ensure that a band saw 5 to be machined is supported in a desired position with respect to the machine throughout the machining of the tips 7 provided upon the teeth 7A of the band saw as indicated in FIG. 2. The members 4 are so positioned that the saw 5 is supported with its lower edge 6 in a generally horizontal plane. Since the band saw bottom edge 6 is carried by the rolls 4 it can be indexed in conventional manner i.e., displaced lengthwise of the machine body 2 so as to bring successive teeth tips 7 thereof into a tip grinding station/position of the machine at which the tooth/tip can be machined to what ever profile as required by a grinding wheel arrangement very schematically shown at 8.

The grinding wheel arrangement 8 incorporates an electric motor 9, having an output shaft 10 which carries the grinding wheel 11. The arrangement 8 includes means (not shown) whereby the grinding wheel 11 can be advanced and retracted as required for the purposes of the grinding operation.

These arrangements 8 can include, for example, hydraulic rams for controlling the displacement of the grinding wheel 11 towards and away from a tip 7 and possibly tooth gullet 7B to be ground. Such drives and wheel positioning arrangements are very well known and do not require elaboration in this specification.

The positioning of the grinding wheel 11 is Inter-related with the indexing of the saw 5 successively through the tip machining position or working station.

Conventionally, the indexing means 12 includes a finger 13 which is positioned so that during indexing it is able to push against the gullet regions 7B of the teeth 7A to advance to next tooth 7A whose hard material tip 7 is next to be machined into the correct position in which it can be machined by the grinding wheel 11.

Clamping means 14, that are schematically shown in the Figure, are provided for firmly clamping the saw 5 against movement whilst a tip 7 is being machined. Such clamping arrangements are generally well known in the known machines.

Control arrangements 15 are provided for ensuring that the clamping means 14 are released whilst the saw 5 is being indexed and for ensuring that the saw is firmly clamped against displacement during grinding operation on a tooth tip. The control arrangements can comprise hydraulically or pneumatically operable clamp pads 16 which can be caused to press against opposite faces of the saw to prevent movement during machining, The band saw 5 is effectively so supported relative to the machine body 2 that longitudinal lengths/portions 5A and 5B of the saw are positioned at opposite sides of the machine body 2. It will also be noted that the opposite curved end regions 5C and 5D of the saw are well spaced from the machine 2, the extent of spacing depending upon the length of the band saw 5.

It is also important to note that the teeth 7A and tips 7 of the saw are upwardly directed so that they always present a sharp pointed hazard condition.

Since the longitudinal portions 5A and 5B of the band saw 5 are positioned to both sides of the machine body 2 it becomes necessary in order to mount the saw to the machine 1 or to remove the saw from the machine 1 to lift the saw over the grinding machine 8. Bearing in mind the weight (many kilos) of the band saws of the sizes likely to be machined and the flexibility of the saw body the operation of saw mounting or saw removal is relatively difficult. Such difficulties may well be enhanced by the presence of housings/hoods commonly provided to control the distribution of grinding detrius with respect to the machine. Furthermore, it will be appreciated that as a result of the presence of the sharp teeth tips 7 the handling of the saw is fraught with difficulties and danger to persons handling the saw during the mounting upon the machine and particularly during removal of the now sharpened band saw from the machine after the machining operations have been completed.

A further problem arising with the known apparatus particularly arises in the machining of double sided band saws in that teeth are provided along each longitudinal endless edge of the saw. As a result during the machining operation with the known machines the total weight of the saw has to be carried by the tips on the teeth of the longitudinal edge that is cooperating with the saw support arrangements. In the case of the double sided band saw, the support arrangements on the tip grinding machine have to be such that the teeth thereof do not foul or jam with the support arrangements during indexing. This problem can involve considerable problems in supporting the saw during tip machining and excessive machine wear.

An additional factor is that the total weight of the band saw when machining the tips along one longitudinal edge has to be supported by the already sharpened tips on the teeth along the other edge. Hence, when the supporting tips have already been machined they are readily prone to damage during the machining of the other tips.

Figure 3:
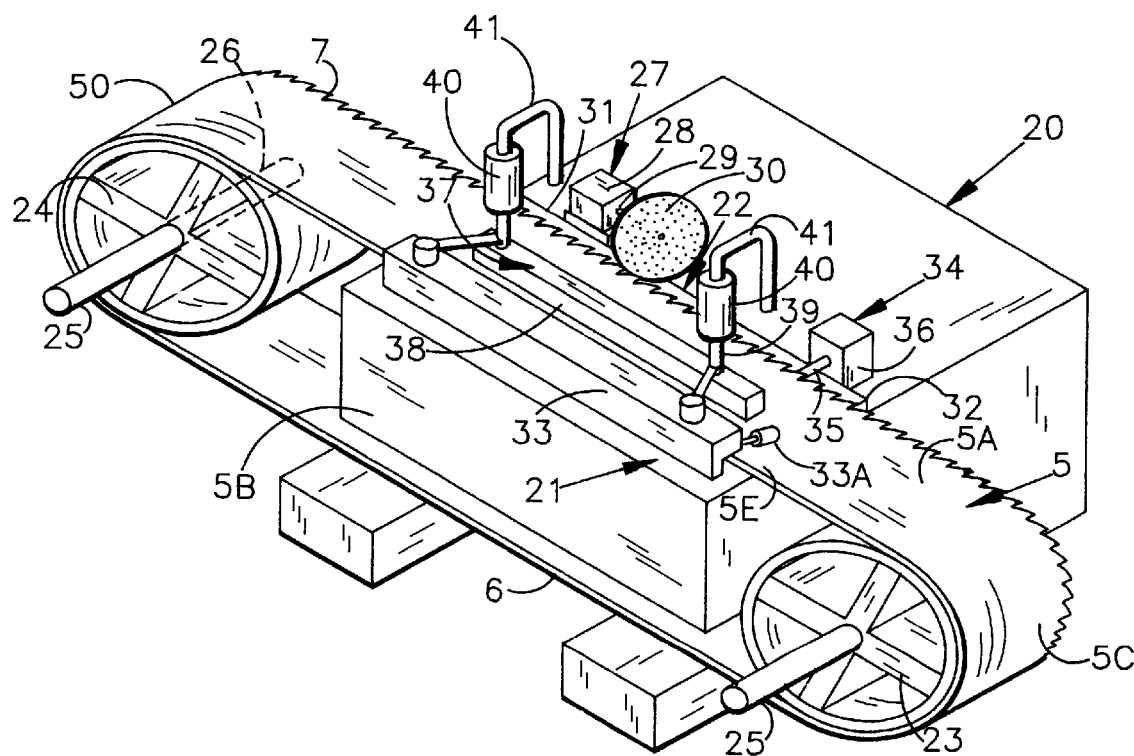
FIG. 3, very schematically illustrates a machine, specifically for tip grinding, incorporating the concepts of the invention.

Referring now to FIG. 3 this as mentioned very schematically illustrates a band saw grinding machine incorporating the concepts of the invention.

As has been indicated the concepts of the present invention provides a method and apparatus for machining a band saw in which the plane of the body of the saw is such that the weight of the saw is not carried by an edge of the saw when being machined or otherwise subjected to manufacturing/repair operations such as tipping, swaging heat treating, tip face grinding etc.

FIG. 3 schematically illustrates a machine for the machining of a band saw 5, the machine including means for so supporting the saw during the machining thereof that the body of the band saw 5 is maintained in a position in which the weight of the blade is not transmitted through an endless edge of the band saw.

Since the actual individual operations involved in the production/repair of a band saw such as the machining of the hard material tips provided upon the teeth of a band saw are basically the same what ever the orientation of the band saw during machining of such tips it is not thought necessary to provide highly detailed drawings and associated descriptions of the individual components of the machine incorporating the concepts of the invention such components including means for top and front face machining; aide face machining; swaging; heat treating whether separately involved or where two processes are possible with a single machine. For example, in relation to the machining of the tip faces the machining components could include the grinding wheel and its drives; the indexing mechanism and its operational control arrangements; the construction of the machine body for mounting such operational elements, the form and positioning of operating levers and/or wheels and/or any electrical/pneumatic/hydraulic circuitry for inter-relating the operation of the said various components.

Thus, for the purpose of this description, only a broad indication will be given of the location of such components which are particularly related or otherwise consequential upon the positioning of the band saw body as required by the concepts of the invention during machining or other operation to be carried out upon the band saw.

Referring now to FIG. 3 in particular, the apparatus of FIG. 3 includes a main machine body 20 providing a main support table 21 which lies in a horizontal plane and which defines a horizontal surface for supporting in a horizontal plane the horizontal portion/length 5A body of the band saw 5 whose hard material tips are, in the arrangement shown in the FIG. 3, to be machined for its lengthwise displaceable movements with respect to the machining station/position 22 of the machine for the purposes of the machining of the hard material tips 7 provided upon the teeth 7A of the band saw 5.

The opposite end portions 5C and 5D of the band saw are carried by support wheels 23 and 24 rotatably mounted upon support shafts 25 which are in turn mounted from support rails 26, With this arrangement the support wheels are selectively displacable relative to each other to enable band saws of differing lengths to be mounted to the machine, and also to enable the support wheels 23 and 24 to move lengthwise of their shafts when loading/unloading a band saw to the machine.

In the position shown in the FIG. 3 it will be noted that the portions/lengths 5A and 5B are horizontal and are located one above the other as compared with the vertical arrangement of the known machines exemplified by FIG. 1.

The table 21 thus serves to support a length 5E (part of the longitudinal length 5A) of the saw 5 extending to either side of the machining position/station 22 at which is located means for effecting the particular manufacturing/repair operation intended, for example, in the case of tip grinding, a grinding wheel assembly 27.

This grinding wheel assembly 27, includes an electric motor 28 whose output shaft 29 either directly or through a gear box or equivalent drive operationally connects with a grinding wheel 30. The assembly 27 includes means 31 (schematically shown as a block) which enables the grinding wheel 30 to be positionally displaceable towards and away from the tip 7 which is to be machined when at the grinding position/station 22.

It should be noted that whilst in the FIG. 3 only a single grinding wheel has been shown, in practice, depending upon the particular machining operation or operations to be carried out upon a tip 7 and/or tooth gullet more than a single grinding wheel may be required. The precise nature of the grinding wheel assembly 27, will thus be set by the particular face or faces of the tip 7 and/or gullet it is desired to grind. That is, which of the various possible faces upon a tip 7 it is required to be able to grind; i.e., top face; front face; and/or side faces. In a highly complex arrangement it may well be desired to be able to machine the two side faces, the top face and/or the front face and perhaps the gullet also. In such a case two or perhaps three grinding wheels assemblies and associated grinding wheels could be involved. In practice, the nature of the faces to be machined will effectively decide upon the number of, the relative positioning of, the operational sizes and/or operational speeds of the grinding wheels, and as a consequence the structure of motors and their associated drives to the grinding wheels.

In practice, the particular formation of the support table in the vicinity of the machining station will be such as to allow access to the tip 7 to be machined by what ever grinding wheel or wheels assemblies are involved whilst at the same time ensuring that the support given to the length/portion 5E of the saw 5 in the vicinity of the machining station 22 is not excessively reduced.

For the purposes of this specification a suitably dimensioned recess has been indicated by the line 32, the recess being provided to accommodate the grinding wheel or wheels etc., during the use thereof. In other words, during machining of a tip 7 clearances have to be provided for the execution of the positioning and the grinding movements of the grinding wheel(s) 30.

It is necessary to ensure that the saw is correctly positioned with respect to the machining position so as to ensure as far as possible that each tip 7 to be machined is, before grinding, located in a precisely similar position when in the machining position/station 22. This positioning is achieved by a combination of saw indexing arrangements and saw guiding arrangements. The saw guide arrangements include a guide bar 33 which is intended to guidingly cooperate with the length SE of the band saw 5 in the immediate vicinity of the working position/station 22. To achieve this requisite guiding the guide bar 33 cooperates with the band saw edge that is remote from the edge with the teeth 7A with the tips 7 to be machined.

In order to counteract the possibility of the band saw drifting away from the guide 33, rolls 33A, suitably angled with respect to the direction of advance of the saw during indexing, are associated with the guide 33. These rolls 33A press downwards onto the surface of the saw length 5E to produce a component of force which tends to urge the saw always into operational contact with the guide 33.

The machine includes a saw position indexing means 34 which is schematically shown as a finger 35 projecting from a control unit 36 which is operative to cause the finger 35 successively to cooperate with the gullet regions 7B of the teeth 7A so as for each of its indexing movements the band saw 5 is displaced through a distance equal to the tooth pitch of the saw each time it is required to advance the next tip 7 to be machined to the working station 22.

Since it is essential that the saw should not move whilst any of the aforementioned operations are carried out upon the saw i.e., whilst a tip is being machined, clamping means 37 are provided for preventing any such movements by cramping the aforesaid length 5E firmly against the support 21.

In particular, the clamping means 37 can comprise an elongate bar 38 (as indicated in the FIG. 3) which is located in the vicinity of the tip 7 being machined and extends to either side of such tip 7. The saw length 5E is firmly cramped against the table 21 to either side of the tip 7 being machined throughout the machining operation so that any tendency of the band saw body to twist or otherwise move is prevented.

The opposite ends of the clamping bar 38 can be connected to the rams 39 of hydraulic ram units 40 supported by suitable supports 41 from the machine body 20 so that the clamping bar 38 can be lifted upwards to allow a saw to be moved for indexing purposes or passed therebeneath when mounting and/or removing a saw. During these indexing movements the guide bar 33 and the rolls 33A will be cooperating with the saw 5.

The clamping means 37 will, of course, need be released when the blade is being indexed. It will, therefore, be understood that the operation of the clamping means will be inter-related with the operational movements of the grinding wheels and the indexing means 34. In practice, the clamping means 37 can be of any convenient form and will, in practice, be located at the position of the machine at which the clamping means would achieve optimum performance.

As so far described it will be noted that in accordance with the invention the body of the saw cooperates with the support surface 21 i.e., in the embodiment shown is horizontally arranged for the purposes of grinding or which ever other operation i.e., machining, tipping, heat treating, swaging is required to be carried out on the saw. This, in practical terms, means that in order to mount a band saw to be machined onto the machine it is only necessary to offer the saw to the machine by mounting it upon the support wheels 23,24; lifting the clamping and guide means 37,33 to allow passage of the saw; pushing the saw 5 onto the support table 21 until the rear edge thereof it is able to cooperate with the guide 33 after it has been lowered; setting the wheels 23 and 24 to achieve a requisite tension in the saw; ensuring alignment of the rear edge of the length 5E with the guide 33; indexing the saw to a tip machining position for the first tip to be machined; and operating the clamping means to cramp the length 5E towards the table 21. After this has been achieved the machining operations can be started for cyclic continuous operation.

As so far described it will be noted that the machine configuration is such that the uppermost horizontal run 5A of the band saw is located in the machining station.

Figure 4:
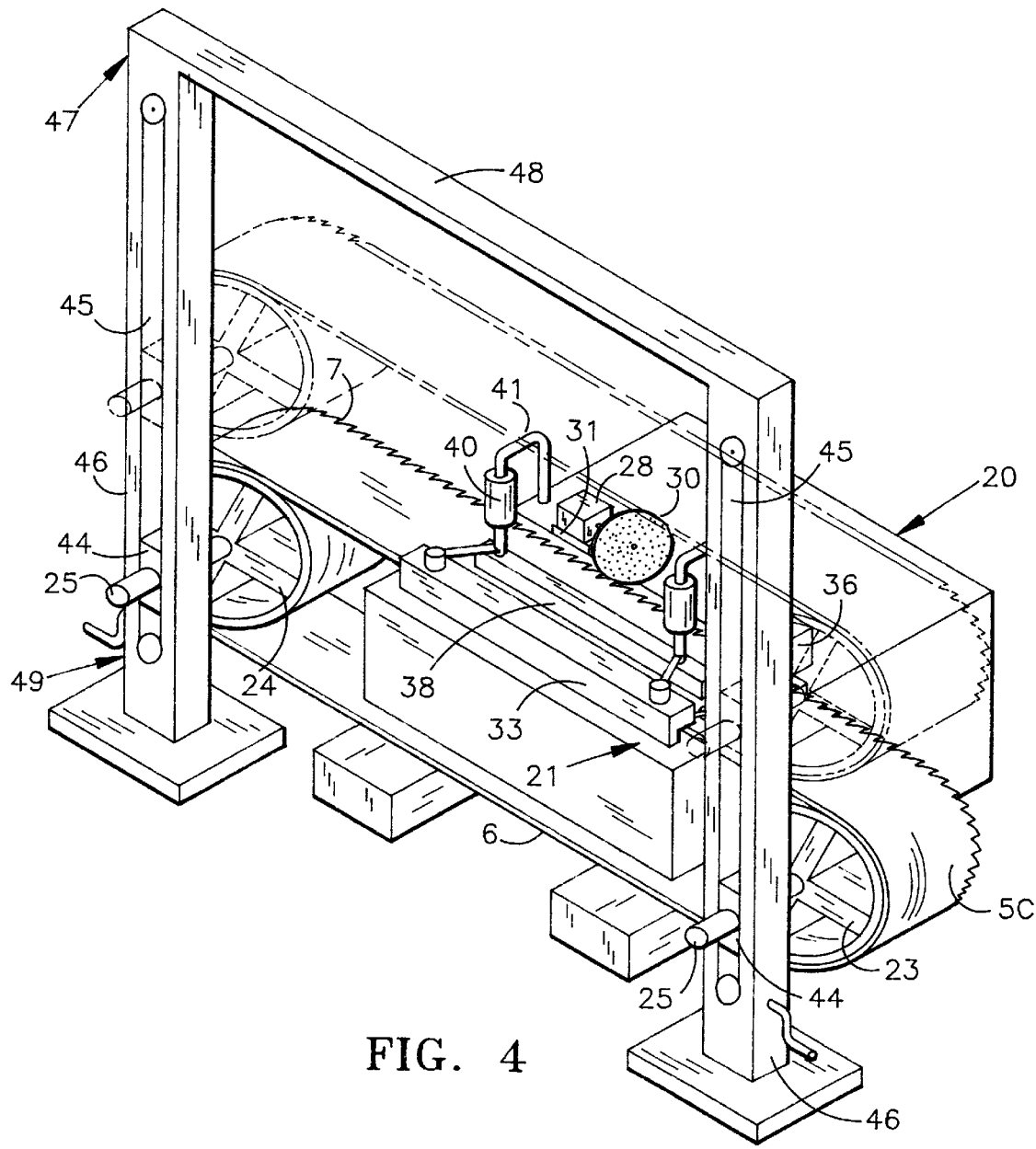
FIG. 4 very schematically illustrates the machine of FIG. 3 when incorporating a modified form of band saw handling arrangements.

FIG. 4 illustrates an embodiment of the invention in which the lowermost horizontal length 5B of the band saw is the one that is subjected to the machining or other operation.

In otherwords, the band saw is supported in an elevated position during the operation to be carried out upon the band saw.

To enable the positioning of the saw in the elevated position which Is shown in dashed lines in the FIG. 4 the shafts 25 associated with the wheels 23 and 24 are mounted in slide blocks or the like 44 mounted for controlled upwards and downwards movements in guide arrangements 45 provided in the uprights 46 of a support frame arrangement 47 including a cross piece 48. The support frame arrangement will be of such particular construction as to be capable of supporting the wheels 23 and 24 when in an elevated position as shown by the dashed lines and at the lowered position, that is similar to the position shown in FIG. 3.

The slide blocks are displaceable with respect to the guide arrangements by any convenient means. In the FIG. 4 a manually operable chain system has been indicated at 49. It will be understood that any form of control for the displacement of the wheels can be used. Although not specifically shown in the Figure, it will understood that the particular construction of the support frame arrangement makes provision for the separation between the shafts to be varied so as to accommodate differing band saw lengths and for the mounting of a saw to the wheels 23 and 24 and its subsequent removal. For example, the construction of the support frame arrangement can provide for the uprights to be moveable towards and away from each other. Alternatively, the slide blocks can connect with bars or the like in which the shafts are mounted for adjustable setting. It will also be appreciated that the structure of the support frame work will be such as to facilitate positioning of the band saw upon the wheels 23 and 24.

I claim:

1. A method of handling a band saw for finishing saw teeth of the band saw, comprising the steps of: mounting the band saw upon a pair of rotatable supports positionally adjustable relative to each other to accommodate mounting and unloading different lengths of band saw, positioning said supports in a generally horizontal arrangement; raising the rotatable supports and a band saw carried thereby to such level with respect to a work position so that a lower length of the band saw is presented to said work position; advancing the supports and the thus mounted band saw to the work position at which the band saw can be subjected to at least one finishing operation; and effecting finishing operations comprising executing sharpening operations on at least one working face of each of the teeth of the band saw.

2. A method as claimed in claim 1, further comprising the steps of indexing the band saw, to present, sequentially, each of the teeth of the band saw to said work position, and urging the band saw by means of a force produced by said indexing step, into guiding contact with a guide means for positioning the band saw with respect to the work position for purposes of effecting such said finishing operations.

3. A method as claimed in claim 2, and wherein the step of urging the band saw comprises the steps of: providing at least one roll having an axis of rotation arranged at an angle with respect to the direction of displacement of the band saw, and applying the at least one roll in cooperating engagement with the band saw during indexing with respect to the work position.

4. A method of handling a band saw comprising the steps of mounting the band saw upon a pair of rotatable supports positionally adjustable relative to each other to accommodate mounting and unloading different lengths of band saw, positioning said supports in a generally horizontal arrangement, raising the rotatable supports and a band saw carried thereby to such level with respect to a work position so that a lower length of the band saw is presented to said work position; advancing the supports and the thus mounted band saw to the work position at which the band saw can be subjected to at least one finishing operation; and executing finishing operations on at least one working face of each of the teeth of the band saw.

5. An apparatus for handling a band saw for the purposes of mounting, effecting finishing operations upon the band saw at a work station and unloading the band saw, comprising: a plurality of adjustable and rotatably indexing supports for mounting a band saw in a generally horizontal setting at said work station, each support including an axis of rotation and a contacting surface for contacting the band saw so that the weight of the band saw is not carried by an edge of the saw; a supporting frame for positioning the supports relative to the work station so that said finishing operations can be carried out upon a length of the band saw that is uppermost as the band saw is mounted upon the supports, and an adjustment means for enabling positional adjustment of the separation of the axes of rotation of the supports to accommodate mounting and unloading differing band saw lengths; and displacement means for axially displacing the rotatable supports towards and away from said work station.

6. An apparatus for handling a band saw, as described in claim 5, further comprising heightwise adjustment means for adjusting the height of the supports so that the band saw carried thereby can be raised to a level with respect to the work station so that said finishing operations can be carried out upon a length of the band saw that is lowermost as the band saw is mounted upon the supports is presented to the work station.

7. An apparatus for handling a band saw, as described in claim 5, further comprising: a guide means for positioning the band saw at the work station, and force producing means utilizing the indexing of the supports and the band saw supported thereon with respect to the work station to produce a force which acts to urge the band saw into guiding contact with the guide means during such indexing.

8. An apparatus for handling a band saw, as described in claim 7, wherein said force producing means comprises one roll cooperating with the band saw and having its axis of rotation arranged at an angle with respect to the direction of displacement of the band saw during indexing with respect to the work station.

* * * * *